United States Patent [19]

Müller et al.

[11] 4,410,589
[45] Oct. 18, 1983

[54] PROCESS FOR IMPROVING THE MINERAL ASPHALT COATINGS FOR STREETS AND PATHS AND PRODUCTS

[75] Inventors: Karl-Hans Müller, Bruchkobel; Walter Barthel, Langenselbold; Rolf Oelmüller, Hanau, all of Fed. Rep. of Germany

[73] Assignee: Degussa Aktiengesellschaft, Frankfurt, Fed. Rep. of Germany

[21] Appl. No.: 247,866

[22] Filed: Mar. 26, 1981

Related U.S. Application Data

[63] Continuation of Ser. No. 142,747, Apr. 22, 1980, abandoned, which is a continuation of Ser. No. 957,823, Nov. 6, 1978, abandoned.

[30] Foreign Application Priority Data

Dec. 13, 1977 [DE] Fed. Rep. of Germany ....... 2755450

[51] Int. Cl.³ .......................... B32B 5/16; B32B 9/00; B32B 15/00
[52] U.S. Cl. ................................ 428/331; 106/281 R; 404/75; 427/138; 427/139; 427/403; 428/446; 428/454; 428/489
[58] Field of Search ........................ 427/138, 139, 403; 106/281 R; 404/75; 252/311.5; 428/331, 446, 454, 489

[56] References Cited

U.S. PATENT DOCUMENTS

| | | | |
|---|---|---|---|
| 2,706,688 | 4/1955 | Sommer et al. | 252/311.5 |
| 3,824,109 | 7/1974 | Richards | 106/281 R |
| 3,902,914 | 9/1975 | Gagle et al. | 106/281 R |
| 3,920,470 | 11/1975 | Bertrand | 106/281 R |
| 3,965,281 | 6/1976 | Takase et al. | 427/139 |

FOREIGN PATENT DOCUMENTS 691298 10/1941 Fed. Rep. of Germany .
2335672 2/1974 Fed. Rep. of Germany .

OTHER PUBLICATIONS

Industrial Minerals and Rocks, The American Institute of Mining & Metallurgical Engineers, N.Y., 1937, pp. 76, 77, 129, 135–137, 163,164,455,456,515, 601, 722, 873, 911 and 912.
Handbook of Chemistry and Physics 54th Edition pp. B-193 to B-197.
Kirk-Othmer, Encyclopedia of Chemical Technology, 2nd Ed. vol. 10, pp. 540–543, vol. 18, pp. 137–140 and 156–159.
Iler, R. K. "The Colloid Chemistry of Silica and Silicates", 1955, pp. 157–174.

Primary Examiner—Sadie L. Childs
Attorney, Agent, or Firm—Cushman, Darby & Cushman

[57] ABSTRACT

There is provided a process for improving mineral asphaltic coatings for streets and roadways comprising preparing a mixture to be used as the base mineral asphalt coating material, homogeneously mixing in 0.1 to 10 weight % of silica which is either (1) a precipitated silica, (2) a precipitated and spray dried silica or (3) a pyrogenically produced silica and further working this mixture into a mineral asphalt coating for streets and roadways.

32 Claims, 1 Drawing Figure

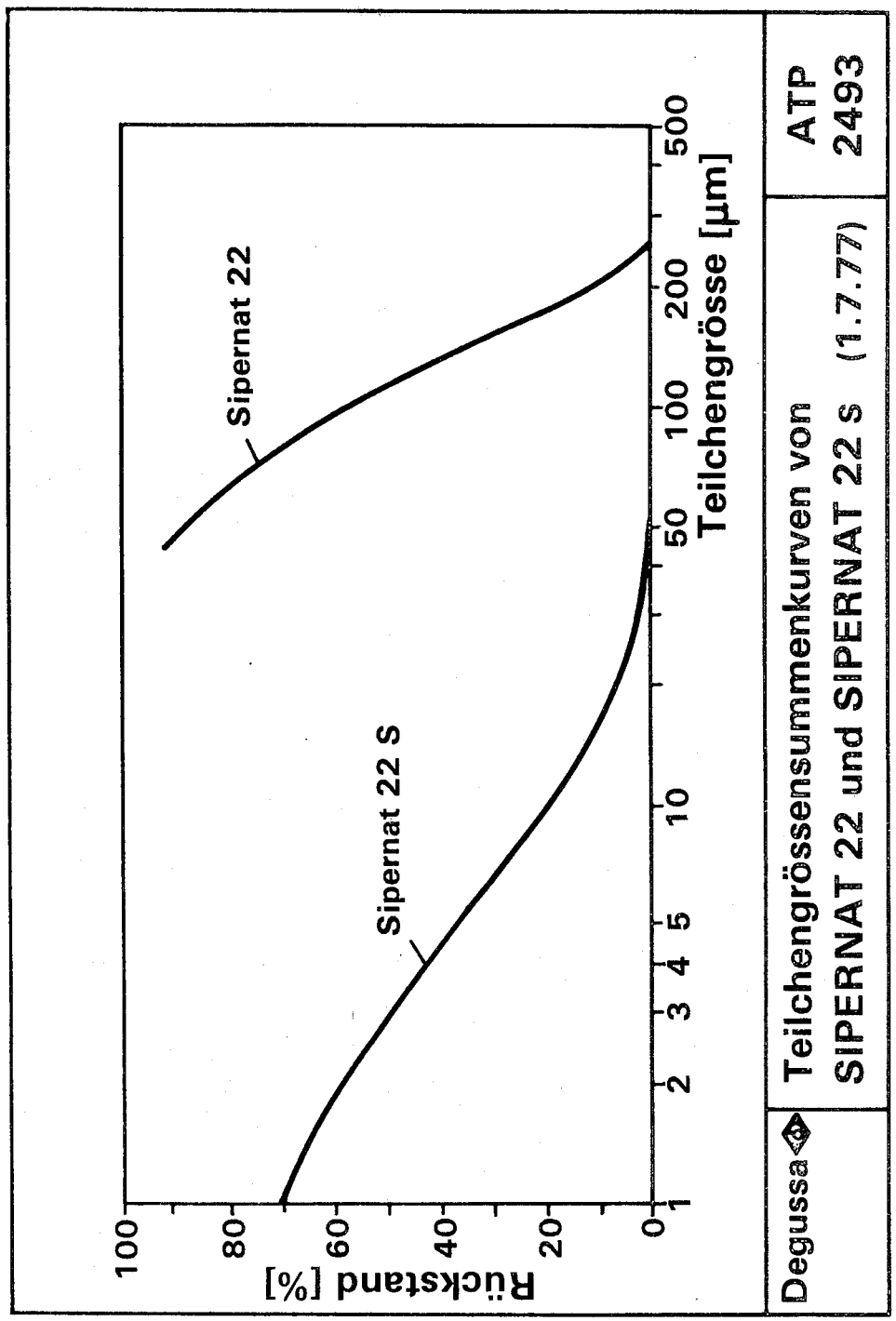

PROCESS FOR IMPROVING THE MINERAL ASPHALT COATINGS FOR STREETS AND PATHS AND PRODUCTS

This is a continuation, of application Ser. No. 142,747 filed Apr. 22, 1980 which is a continuation of Ser. No. 957,823 filed Nov. 6, 1978 and now both abandoned.

BACKGROUND OF THE INVENTION

The invention is directed to a process for improving mineral asphalt coatings for streets and roadways, i.e., pavements.

The development of street traffic in the last twenty years has brought about significant changes. A steadily increasing passenger automobile traffic coincided with a growing heavy load traffic. The heavy load traffic was still carried by the trend "go to the road" so that particularly high growth rates of the loaded transport on the streets has been achieved. An end of this development is not yet seen, especially since the building of vehicles presents always larger transport vehicles. The heavy load of the streets often leads to strong appearances of wear in very short times. The repairs needed as a result and the needed reconditioning yearly cost large sums of money.

As a result of the high loads or insufficient stability, crumblings and grooves are observed in the street coating. In summer, the street surfaces warm up to considerable temperatures. Because of their thermoplastic properties, the binding agent becomes pliable and spreads. If the asphalt coating then lacks the so-called inner hollow space, the bitumen or the tar mass with a part of the mineral fine portion enters the surface. The reconditioned portion of the asphalt coating changes because simultaneously the fine gravel portion is pressed downwardly by the load. On the surface of the asphalt coating there continuously appear growing specks. One then speaks of the so-called "sweating". Grooves and crumblings particularly in curves occur. Both phenomena are sources of danger which problematically can be present with the wetness (aqua-planning) that occurs. In winter, the asphalt becomes brittle as a result of which the low grade asphalt which, because of their mineral properties, cannot take up high amounts of binder, are endangered. The cold embrittlement leads to the loosening of the finely ground particles, surface damage and quicker abrasion or wear. In such cases, one speaks of the "deterioration" of the asphalt coating. These surfaces offer salt strewn on the street good places for attack so that frequent repair of the binder layer of the street surface is necessary.

For a long time efforts have been made to be able to use these expensive capital investments for a longer time. The forbidding of spiked tires is understood from this point of view. The development of high quality and especially durable street coatings represents the ample and important alternative.

Street construction materials improved by additives can delay the wearing out and increase the carrying capacity. Known additives are especially asbestos fibers and asbestos flour/synthetic resin granulates and liquid synthetic resin components as well as pulverized waste materials as for example "red filler" from the recovery of aluminum. The asbestos in part produces quite usable results. However, in the future, this must be given up because this additive appears to be injurious to the health. Synthetic resins products do not always satisfy the requirements or must be supplied in too large proportions so that there is a drop in the economy of the product. In the mixing process of the asphalt coating materials themselves also an addition of certain materials frequently does not permit the necessary temperatures.

SUMMARY OF THE INVENTION

The object of the invention is the development of a process (and the resultant product) for improving mineral asphaltic coatings for streets and roadways (i.e., pavements) which are characterized by producing a mixture for the mineral asphaltic coating (or layer), in which mixture there is homogeneously mixed in 0.1 to 10 weight % of silica and this mixture in a manner known of itself further worked into a mineral asphaltic layer for streets and roadways (i.e., pavements).

In a preferred form of the invention, the silica can be added in an amount of 0.1 to 2 weight %.

As silica there can be used either a precipitated silica or a precipitated and spray dried silica or a pyrogenically produced silica. Such silicas are very finely divided.

Thus, there can be used as a precipitated silica a silica with the following physico-chemical properties:

| | |
|---|---|
| Appearance | loose, white powder |
| X-ray structure | amorphous |
| Surface area | 170 m$^2$/g (according to BET) |
| Average size of the primary particles | 18 Nanometer |
| Specific gravity | 2.05 g/ml |
| Degree of purity | $SiO_2$[6] 98% |
| | $Na_2O$[6] 1% |
| | $Al_2O_3$[6] 0.2% |
| | $SO_3$[6] 0.8% |
| Loss on drying[1] | 6% |
| Loss on annealing[2,3] | 5% |
| pH-value[4] | 6.3% |
| Solubility | practically insoluble in water |
| Characteristics | precipitated silica |
| Tamped density[5] | 200 g/liter |
| Sieve residue according to Mocker (DIN 53 580) | 0.2% |

DIN is the abbreviation for German Industrial Standard
[1]DIN 53 198, Process A
[2]based on the substance dried for 2 hours at 105° C. DIN 55 921
[3]DIN 52 911
[4]DIN 53 200
[5]DIN 53 194
[6]based on the material annealed at 1000° C.

As a further example of a precipitated silica which can be used as a silica according to the invention is one having the following physico-chemical data:

| | |
|---|---|
| Appearance | loose, white powder |
| X-ray structure | amorphous |
| Surface area | 170 m$^2$/g (according to BET) |
| Average size of the primary particles | 18 Nanometer |
| Specific gravity | 2.05 |
| Degree of purity | $SiO_2$[6] 98% |
| | $Na_2O$[6] 1% |
| | $Al_2O_3$[6] 0.2% |
| | $SO_2$[6] 0.8% |
| Loss on drying[1] | 6% |
| Loss on annealing[2,3] | 5% |
| p-H value[4] | 6.3 |
| Solubility | practically insoluble in water |
| Characteristics | precipitated silica with high powder fineness |
| Tamped density | 70 g/l |
| Sieve residue according to Mocker DIN | 0% |

-continued 53 580

[1] DIN 53 198 Process A
[2] based on the material dried for 2 hours at 105° C.
[3] DIN 52 911
[4] DIN 53 200
[5] DIN 53 194
[6] based on the material annealed at 1000° C.

As an example of a precipitated and spray dried silica which can be added according to the invention there can be used a silica having the following physico-chemical data:

| | | |
|---|---|---|
| Surface area according to BET | $m^2/g$ | 190 |
| Average size of the Primary particles | Nanometer | 18 |
| Average size of the secondary particles | Micrometer | 80 |
| Tamped density (DIN 53 194) | g/l | 220 |
| Loss on drying (DIN 55 921) (2 hours at 105° C.) | % | 6 |
| Loss on annealing[1] (DIN 55 921) (2 hours at 1000° C.) | % | 5 |
| pH-value[4] (DIN 53 200) | | 6.3 |
| $SiO_2$ (DIN 55 921)[2][3] | % | 98 |
| $Al_2O_3$ | % | 0.2 |
| $Fe_2O_3$ | % | 0.03 |
| $Na_2O$ | % | 1 |
| $SO_3$ | % | 0.8 |
| Sieve residue according to Mocker (DIN 53 580) | % | 0.5 |
| Oil number (according to DIN 53 199) | g/100 g | 230 |

[1] based on the material dried for 2 hours at 105° C.
[2] in water: Acetone or Methanol 1:1
[3] based on the material annealed for 2 hours at 1000° C.
[4] contains about 2% of chemically bound carbon As a further example of a precipitated and spray dried silica which can be added according to the invention there can be used a silica having the following physico-chemical data:

| | | |
|---|---|---|
| Surface area according to BET | $m^2/g$ | 190 |
| Average size of the primary particles | Nanometer | 18 |
| Average size of the secondary particles | Micrometer | 5 |
| Tamped density (DIN 53 194) | g/l | 100 |
| Loss on drying (DIN 55 921) (2 hours at 105° C.) | % | 6 |
| Loss on annealing[1] (DIN 55 921) (2 hours at 1000° C.) | % | 5 |
| pH-value[4] (DIN 53 200) | | 6.3 |
| $SiO_2$ (DIN 55 921)[2][3] | % | 98 |
| $Al_2O_3$ | % | 0.2 |
| $Fe_2O_3$ | % | 0.03 |
| $Na_2O$ | % | 1 |
| $SO_3$ | % | 0.8 |
| Sieve residue according to Mocker (DIN 53 580) | % | 0.2 |
| | % | 0.2 |
| Oil number (according to DIN 53 199) | g/100 g | 240 |

[1] based on the material dried for 2 hours at 105° C.
[2] in water: Acetone or Methanol 1:1
[3] based on the material annealed for 2 hours at 1000° C.
[4] contains about 2% of chemically bound carbon As an example of a pyrogenically produced silica which can be added according to the invention there can be used a silica with the following physico-chemical data:

| | | |
|---|---|---|
| Primary particle size | Nanometer | 12 |
| $SiO_2$* | % | >99.8 |
| Mole weight | | 60.09 |
| Surface area according to BET | $m^2/g$ | 200 ± 25 |
| Loss on drying (according to DIN 53 198) (2 hours at 105° C.) | % | <1.5 |
| Loss on annealing (according to DIN 62 911) (2 hours at 1000° C.) | % | <1 |
| pH-value (according to DIN 53 200) (in 4% aqueous Dispersion) | | 3.6–4.3 |
| Grit (according to Mocker, DIN 53 580) | % | <0.05 |
| HCl | % | <0.025 |
| $Al_2O_3$ | % | <0.05 |
| $TiO_2$ | % | <0.03 |
| $Fe_2O_3$ | % | <0.003 |
| $Na_2O$ | % | <0.0009 |
| P | % | <0.0002 |
| Ni | % | <0.0002 |
| Cr | % | <0.0002 |
| Cu | % | <0.00003 |
| Pb | % | <0.00002 |
| S | % | <0.0004 |
| $B_2O_3$ | % | <0.003 |

*based on the material annealed for 2 hours at 1000° C.

The asphalt coating (or layer) obtained according to the process of the invention can be added as the upper or uppermost layer of a street, path or other pavement.

As is well known, a street can be produced in the following manner:

A substructure can be produced from a suitable deposited material which is compacted with suitable vibrating and rolling equipment. A protective layer can be applied on the foundation which can consist of river or mined gravel or mineral concrete. This layer has the very important task of compensating for the seasonal temperature differences between upper layer and lower layer and to serve as drainage. This mineral concrete can consist of a graded granular mineral mixture of sand and broken natural stones, (gravel and fragments). The types of stones can be basalt, biabas, gabbro, porphyry, etc. This frost-protective layer likewise can be compacted. An asphalt coating (asphalt concrete) takes place thereon which can be split up into three types of materials to be mixed (a) carrying layer
    0–32 mm granules or 0–22 mm granules
(b) binder layer
    0–16 mm granules or 0–22 mm granules
(c) covering layer
    0–11 mm granules, 0–8 mm granules or 0–5 mm granules The asphalt layer (asphalt concrete) can consist of
Natural stone fragments 2–32 mm granules (Pure fragments or simple broken fragments)
Sand (round sand = mined sand or river sand)
Broken sand (= sand portion of gravel or fragment production of quarry) 0.09–2 mm granules
Mineral filler (lime powder or suitable filler from the breaking plant) 0–0.09 mm granules.

Bitumen, coal tar, or mixtures of the two of them, produce the binder for the mineral mixture of the above mentioned components. With bitumen or bitumen-tar mixtures, the refineries produce various types of designations and regulations. These are generally directed according to the end hardness, which is specified by penetration values=depth of penetration in tenths of a millimeter or ball and ring value=penetration of a ball in the binder.

The silica addition according to the present invention increase the number of the inner hollow space with asphalt test bodies up to 180 volume %. This hollow space improves the asphaltic concrete and therewith the summer and winter resistance of the upper layer of the street. Because of the higher number of the hollow space, greater portions of the binder can be brought into the asphalt compositions. This makes possible a better resistance to winter since the embrittlement of the asphalt layers at low temperatures is reduced. Higher portions of binder means higher stability, because lower wear values arise as a result of the better adhesion of the mineral constituents. A "deterioration", the most frequent appearance of wear, no longer occurs. The street surface remains closed and offers the strewn salt scarcely any possibility for attack.

A higher content of hollow space has decisive advantages for the summer requirements of street layers or coatings if plastification occurs in the warming up. Binder components which can be taken up by the inner hollow space no longer pass together with mineral fine portions to the surface. Spot formations are no longer the result because simultaneously the coarser fragmented portions no longer are pressed downwardly. The asphalt composition of the invention offer a sufficient number of hollow spaces through which, with heating and expansion, binder components passing out find places inside the structure to which they can be gathered without causing damage to the streets.

Unless otherwise indicated, all parts and percentages are by weight.

The compositions can comprise, consist essentially of or consist of the materials set forth and the process can comprise, consist essentially of, or consist of the steps set forth.

BRIEF DESCRIPTION OF THE DRAWING

The single FIGURE of the drawing is a graph showing the summation particle size distribution of Sipernat 22 and Sipernat 22S.

The invention will be described further in connection with the following examples.

DESCRIPTION OF THE PREFERRED EMBODIMENTS

Method of Testing

For all of the tests there served as foundations for the production of asphalt layers mineral compositions of the same composition:

| | |
|---|---|
| Lime filler | 7% |
| Natural sand (round sand) | 9% |
| Gabbro-finely crushed sand | 27% |
| Gabbro-finely fragmented 2/5 | 27% |
| Gabbro-finely fragmented 5/8 | 30% |
| | 100% = 5 kg |

The place of obtaining the Gabbro stone material is in Gross-Bieberau near Darmstadt, West Germany.

To the above mineral composition there is always added as a binder bitumen B 80. The type designation B 80 gives the penetration or pressing in value in 1/10 mm (DIN 1995). The additions of synthetic silica take place in weight % based on the mineral compositions.

The following working processes were carried out:

1. Heating the individual components for the mineral compositions including the silicas and the binders in the drying cabinet to 180° C.
2. Fragments and sands were placed in a heatable mixing apparatus (compulsory mixer) and mixed.
3. Binder was added and mixed in.
4. Filler (stone flour) and silica were added and homogeneously mixed (mixing time 2-3 minutes).

These were formed from each mixture in the hot condition (140° C.) 3 Marshall bodies [with cylindrical shape, diameter=100 mm, height—60-65 mm (DIN 1996 (pages 4 and 11)] by 50 blows on each side with the Marshall compressing apparatus. These normal bodies were used to establish the density (DIN 1996 (pages 4 and 11), the Marshall stability (kp/cm$^2$) [DIN 1996 (pages 4 and 11)] and the flow values [DIN 1996 (pages 4 and 11) (1/10 mm)]. The determination of the raw density of each mixture [DIN 1996 (page 7)] took place at constant temperature. The inner hollow space content was calculated according to specified regulations and formulas from the individual determinations.

The formula for the calculation of the hollow space $H_{bit}$ reads as follows (Tables and digest for use of Shell-Bitumen January 1973):

$$H_{bit} = 100 \left( \frac{\rho R, bit - \rho A, bit}{\rho R, bit} \right) [\text{Vol. \%}]$$

For control: $M + B + H_{bit} = 100$ [Vol.%]

Therein: $\rho_{R,bit}$=gross density of the Asphalt mixture, determined according to the following formula:

$$\rho R, bit = \frac{100}{B_g \cdot M_g} [\text{g/cm}^3],$$

wherein $B_g$=Binder content in weight percent (DIN 1996, page 6).

$M_g = (100 - B_g)$ = Mineral content in weight —%.

$\rho A,_{bit}$=Volumetric density of the piece being investigated (DIN 1996, page 7, paragraph 4).

As silica there can be added the following silicas: FK 320, FK 320 DS, SIPERNAT 22, SIPERNAT 22 S, AEROSIL 200. They have the following physico-chemical data:

| Precipitated Silica FK 320 | |
|---|---|
| Appearance | loose, white powder |
| X-ray structure | amorphous |
| Surface area | 170 m$^2$/g (according to BET) |
| Average size of the primary particle | 18 Nanometer |
| Specific gravity | 2.05 g/ml |
| Degree of purity | SiO$_2$[6] 98% |
| | Na$_2$O[6] 1% |
| | Al$_2$O$_3$[6] 0.2% |
| | SO$_3$[6] 0.8% |
| Loss on drying[1] | 6% |
| Loss on annealing[2,3] | 5% |
| pH-value[4] | 6.3% |
| Solubility | practically insoluble in water |
| Characteristics | precipitated silica |
| Tamped density[5] | 200 g/liter |
| Sieve residue according to | 0.2% |

-continued
Precipitated Silica FK 320
Mocker (DIN 53 580)

[1] DIN 53 198, Process A  
[2] based on the material dried for 2 hours at 105° C. DIN 55 921  
[3] DIN 52 911  
[4] DIN 53 200  
[5] DIN 53 194  
[6] based on the material annealed 2 hours at 1000° C.

FK 320 DS Precipitated Silica

| | |
|---|---|
| Appearance | loose, white powder |
| X-ray structure | amorphous |
| Surface area | 170 m²/g (according to BET) |
| Average size of the primary particles | 18 Nanometer |
| Specific gravity | 2.05 |
| Degree of purity | $SiO_2$[6] 98% |
| | $Na_2O$[6] 1% |
| | $Al_2O_3$[6] 0.2% |
| | $SO_2$[6] 0.8% |
| Loss on drying[1] | 6% |
| Loss on annealing[2][3] | 5% |
| pH-value[4] | 6.3% |
| Solubility | practically insoluble in water |
| Characteristics | precipitated silica with high powder fineness |
| Tamped density | 70 g/l |
| Sieve residue according to Mocker DIN 53 580) | 0% |

[1] DIN 53 198, Process A  
[2] based on the material dried for 2 hours at 105° C.  
[3] DIN 52 911  
[4] DIN 53 200  
[5] DIN 53 194  
[6] based on the material annealed at 1000° C.

SIPERNAT 22 Precipitated and Spray-Dried Silica

| | | |
|---|---|---|
| Surface area according to BET | m²/g | 190 |
| Average size of the primary particles | Nanometer | 18 |
| Average size of the secondary particles | Micrometer | 80 |
| Tamped density (DIN 53 194) | g/l | 220 |
| Loss on drying (DIN 55 921) (2 hours at 105° C.) | % | 6 |
| Loss on annealing[1] (DIN 55 921) (2 hours at 1000° C.) | % | 5 |
| pH-value (DIN 53 200) | . | 6.3 |
| $SiO_2$ (DIN 55 921)[3] | % | 98 |
| $Al_2O_3$ | % | 0.2 |
| $Fe_2O_3$ | % | 0.03 |
| $Na_2O$ | % | 1 |
| $SO_3$ | % | 0.8 |
| Sieve residue according to Mocker (DIN 53 580) | % | 0.5 |
| Oil number (according to DIN 53 199) | g/100 g | 230 |

[1] based on the material dried for 2 hours at 105° C.  
[2] in water: Acetone or Methanol 1:1  
[3] based on the material annealed at 1000° C. for 2 hours  
[4] contains about 2% of chemically bound carbon

SIPERNAT 22 S Precipitated and Spray-Dried Silica

| | | |
|---|---|---|
| Surface area according to BET | m²/g | 190 |
| Average size of the primary particles | Nanometer | 18 |
| Average size of the secondary particles | Micrometer | 5 |
| Tamped density (DIN 53 194) | g/l | 100 |
| Loss on drying (DIN 55 921) (2 hours at 105° C.) | % | 6 |
| Loss on annealing[1] (DIN 55 921) (2 hours at 1000° C.) | % | 5 |
| pH-value (DIN 53 200) | | 6.3 |
| $SiO_2$ (DIN 55 921)[3] | % | 98 |
| $Al_2O_3$ | % | 0.2 |
| $Fe_2O_3$ | % | 0.03 |
| $Na_2O$ | % | 1 |
| $SO_3$ | % | 0.8 |
| Sieve residue according to Mocker (DIN 53 580) | % | 0.2 |
| Oil number (according to DIN 53 199) | g/100 g | 240 |

[1] based on the material drived 2 hours at 105° C.  
[2] in water: Acetone or Methanol 1:1  
[3] based on the material annealed at 1000° C. for 2 hours  
[4] contains about 2% of chemically bound carbon The summation particle distribution of Sipernat 22 and Sipernat 22S is shown in the drawing.

AEROSIL 200 Pyrogenically Produced Silica

| | | |
|---|---|---|
| Primary Particle size | Nanometer | 12 |
| $SiO_2$* | % | >99.8 |
| Mole weight | | 60.09 |
| Surface area according to BET | m²/g | 200 ± 25 |
| Loss on drying (according to DIN 53 198) (2 hours at 105° C.) | % | <1.5 |
| Loss on annealing (according to CIN 62 911) (2 hours at 1000° C.) | % | <1 |
| pH-value (according to DIN 53 200) (in 4% aqueous dispersion) | | 3.6–4.3 |
| Grit (according to Mocker, DIN 53 580) | % | <0.05 |
| HCl | % | <0.025 |
| $Al_2O_3$ | % | <0.05 |
| $TiO_2$ | % | <0.03 |
| $Fe_2O_3$ | % | <0.003 |
| $Na_2O$ | % | <0.0009 |
| P | % | <0.0002 |
| Ni | % | <0.0002 |
| Cr | % | <0.0002 |
| Cu | % | <0.00003 |
| Pb | % | <0.00002 |
| S | % | <0.0004 |
| $B_2O_3$ | % | <0.003 |

*based on the material annealed at 1000° C. for 2 hours

The results of the individual experiment are collected in Table 1.

TABLE 1

| | Gross density | Test Article Average Value of 3 Articles | | |
|---|---|---|---|---|
| Designation | Asphalt Composition [g/cm³] | Marshall-Value [kp/cm²] | Flow Value [1/10 mm] | Hollow Space [Vol. %] |
| Asphalt Concrete 6.1% 80/without additive | 2.508 | 870 | 39 | 2.6 — |
| Asphalt Concrete, 6.1% 80 + 1.0% FK 320 | 2.492 | 860 | 38 | 3.4 (+30.7%) |
| Asphalt Concrete, 6.1% 80 + 1.0% FK 320 DS | 2.494 | 915 | 35 | 4.1 (+57.7%) |
| Asphalt Concrete, 6.1% | 2.497 | 890 | 29 | 6.1 (+135%) |

TABLE 1-continued

| Designation | Gross density Asphalt Composition [g/cm³] | Test Article Average Value of 3 Articles | | |
|---|---|---|---|---|
| | | Marshall-Value [kp/cm²] | Flow Value [1/10 mm] | Hollow Space [Vol. %] |
| 80 + 1.0% SIP. 22 | | | | |
| Asphalt Concrete, 6.1% | 2.498 | 880 | 35 | 4.3 (+65.3%) |
| 80 + 0.5% SIP. 22 | | | | |
| Asphalt Concrete, 7.0% | 2.464 | 810 | 39 | 3.1 |
| 80 + 1.0% SIP. 22 | | | | |
| Asphalt Concrete, 6.1% | 2.491 | 960 | 38 | 3.6 (+38.5%) |
| 80 + 1.0% SIP. 22 S | | | | |
| Asphalt Concrete, 7.0% | 2.466 | 710 | 48 | 2.5 |
| 80 + 1.0% SIP. 22 S | | | | |
| Asphalt Concrete, 6.1% | 2.493 | 990 | 37 | 7.3 (+180%) |
| 80 + 1.0% AE. 200 | | | | |
| Asphalt Concrete, 6.1% | 2,503 | 830 | 41 | 3.4 (+30.7%) |
| 80 + 0.3% AE 200 | | | | |

An asphaltic concrete with a bitumen portion of 7 weight % at this composition of the minimal composition without the addition of silica does not show sufficient stability and an insufficient hollow space content.

When the results in the table are compared with each other, it is ascertained that there is an increase of the hollow space with all additions of silica. The Marshall value likewise experiences an increase in temperature. Therewith evidence is produced that synthetic silicas are in a position to take up binders and to improve the hollow space content and to contribute to the stability.

What is claimed is:

1. A process for improving a mineral asphaltic layer of a pavement consisting essentially of homogeneously admixing 0.1 to 10 weight % of silica into mineral asphalt and then converting this into a pavement layer, said silica being either (1) a precipitated silica, (2) a precipitated and spray dried silica or (3) a pyrogenically produced silica.
2. The product prepared by the process of claim 1.
3. The product of claim 2 wherein the pavement layer is a street layer.
4. The product of claim 2 wherein the pavement layer is the top layer of a pavement.
5. The process of claim 1 wherein the silica is a precipitated silica.
6. The product prepared by the process of claim 5.
7. The process of claim 1 wherein the silica is precipitated and spray dried silica.
8. The product prepared by the process of claim 7.
9. The process of claim 1 wherein the silica is a pyrogenically produced silica.
10. The product prepared by the process of claim 9.
11. The process of claim 1 wherein there is employed 0.1 to 1 weight % of the silica.
12. The product prepared by the process of claim 11.
13. The process of claim 1 wherein the silica is a precipitated silica having the following properties:

| Appearance | loose, white powder |
|---|---|
| X-ray structure | amorphous |
| Surface area | 170 m²/g (according to BET) |
| Average size of the primary particles | 18 Nanometer |
| Specific gravity | 2.05 g/ml |
| Degree of purity | SiO₂ 98% |
| | Na₂O 1% |
| | Al₂O₃ 0.2% |
| | SO₃ 0.8% |
| Loss on drying | 6% |
| Loss on annealing | 5% |
| pH-value | 6.3% |
| Solubility | practically insoluble in water |
| Characteristics | precipitated silica |
| Tamped density | 200 g/liter |
| Sieve residue according to Mocker | 0.2% |

14. The product prepared by the process of claim 13.
15. The process of claim 1 wherein the silica is a precipitated silica having the following properties:

| Appearance | loose, white powder |
|---|---|
| X-ray structure | amorphous |
| Surface area | 170 m²/g (according to BET) |
| Average size of primary particles | 18 Nanometer |
| Specific gravity | 2.05 |
| Degree of purity | SiO₂ 98% |
| | Na₂O 1% |
| | Al₂O₃ 0.2% |
| | SO₂ 0.8% |
| Loss on drying | 6% |
| Loss on annealing | 5% |
| pH-value | 6.3 |
| Solubility | practically insoluble in water |
| Characteristics | precipitated silica with high powder fineness |
| Tamped density | 70 g/l |
| Sieve residue according to Mocker | 0% |

16. The product prepared by the process of claim 15.
17. The process of claim 1 wherein the silica is a precipitated and spray dried silica having the following properties:

| Surface area according to BET | m²/g | 190 |
|---|---|---|
| Average size of the primary particles | Nanometer | 18 |
| Average size of the secondary particles | Micrometer | 80 |
| Tamped density | g/l | 220 |
| Loss on drying (2 hours at 105° C.) | % | 6 |
| Loss on annealing (2 hours at 1000° C.) | % | 5 |
| pH-value | % | 6.3 |
| SiO₂ | % | 98 |
| Al₂O₃ | % | 0.2 |
| Fe₂O₃ | % | 0.03 |
| Na₂O | % | 1 |
| SO₃ | % | 0.8 |
| Sieve residue according to Mocker | % | 0.5 |

| | | |
|---|---|---|
| Oil number | g/100 g | 230 |

18. The product prepared by the process of claim 17.

19. The process of claim 1 wherein the silica is a precipitated and spray dried silica having the following properties:

| | | |
|---|---|---|
| Surface area according to BET | m²/g | 190 |
| Average size of the primary particles | Nanometer | 18 |
| Average size of the secondary particles | Micrometer | 5 |
| Tamped density | g/l | 100 |
| Loss on drying (2 hours at 105° C.) | % | 6 |
| Loss on annealing (2 hours at 1000° C.) | % | 5 |
| pH-value | | 6.3 |
| SiO₂ | % | 98 |
| Al₂O₃ | | 0.2 |
| Fe₂O₃ | % | 0.03 |
| Na₂O | % | 1 |
| SO₃ | % | 0.8 |
| Sieve residue according to Mocker | % | 0.2 |
| Oil number | g/100 g | 240 |

20. The product prepared by the process of claim 19.

21. The process of claim 1 wherein the silica is a pyrogenically produced silica having the following properties:

| | | |
|---|---|---|
| Primary particle size | Nanometer | 12 |
| SiO₂ | % | >99.8 |
| Mole weight | | 60.09 |
| Surface area according to BET | m²/g | 200 ± 25 |
| Loss on drying (2 hours at 105° C.) | % | <1.5 |
| Loss on annealing (2 hours at 1000° C.) | % | <1 |
| pH-value (in 4% aqueous dispersion) | | 3.6–4.3 |
| Grit (according to Mocker) | % | <0.05 |
| HCl | % | <0.025 |
| Al₂O₃ | % | <0.05 |
| TiO₂ | % | <0.03 |
| Fe₂O₃ | % | <0.003 |
| Na₂O | % | <0.0009 |
| P | % | <0.0002 |
| Ni | % | <0.0002 |
| Cr | % | <0.0002 |
| Cu | % | <0.00003 |
| Pb | % | <0.00002 |
| S | % | <0.0004 |
| B₂O₃ | % | <0.003 |

22. The product prepared by the process of claim 21.

23. The process of claim 1 which consists essentially of admixing the silica into the mineral asphalt and then converting this admixture into a pavement layer.

24. The product prepared by the process of claim 23.

25. The process of claim 1 for improving a mineral asphalt layer of a pavement consisting of homogeneously admixing 0.1 to 10 weight % of silica into a pavement layer, said silica being either (1) a precipitated silica, (2) a precipitated and spray dried silica or (3) a pyrogenically produced silica.

26. The product prepared by the process of claim 25.

27. The process of claim 1 which consists of admixing the silica into the mineral asphalt and then converting this mixture into a pavement.

28. The product prepared by the process of claim 27.

29. The process of claim 1 wherein the mineral asphaltic layer comprises natural stone fragments, sand, and mineral filler together with bitumen, coal tar or a mixture of bitumen and coal tar.

30. A product prepared by the process of claim 29.

31. The process of claim 1 wherein the pavement layer is formed by applying said mixtures of silica and mineral asphalt as a top layer to a pavement substructure.

32. The process of claim 29 wherein the pavement layer is formed by applying said mixture of silica and mineral asphalt as a top layer to a pavement substructure.

* * * * *